Figure 1:
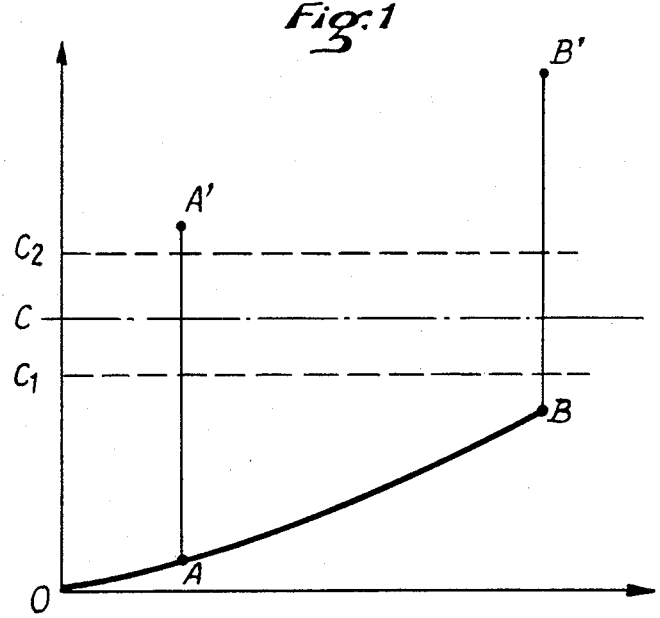

United States Patent [19]

Plaquin et al.

[11] Patent Number: 4,641,410
[45] Date of Patent: Feb. 10, 1987

[54] METHOD AND APPARATUS FOR MAKING A JOINT FOR STEEL TUBES

[75] Inventors: Bernard A. Plaquin; Louis Fradin, both of Aulnoye, France

[73] Assignee: Vallourec, Paris, France

[21] Appl. No.: 714,970

[22] Filed: Mar. 22, 1985

[30] Foreign Application Priority Data

Mar. 22, 1984 [FR] France .................. 84 04432

[51] Int. Cl.⁴ ............... B23Q 17/00; G01B 3/48; G01B 3/40
[52] U.S. Cl. ................................. 29/407; 33/199 R
[58] Field of Search ............... 33/199 R, 199 B, 531, 33/529, 178 R; 29/407

[56] References Cited

U.S. PATENT DOCUMENTS

| | | | |
|---|---|---|---|
| 1,535,098 | 4/1925 | Buckingham | 33/199 R |
| 1,792,936 | 2/1931 | Skarl | 33/199 R |
| 2,387,814 | 10/1945 | Straw | 33/199 R |
| 2,680,301 | 6/1954 | Steczynski | 33/199 R |
| 3,047,960 | 8/1962 | Mittensberg et al. | 33/199 R |
| 4,479,306 | 10/1984 | Klemnetich | 33/199 R |

FOREIGN PATENT DOCUMENTS

| | | |
|---|---|---|
| 2178948 | 11/1973 | France . |
| 2349095 | 11/1977 | France . |
| 2364322 | 4/1978 | France . |
| 2518635 | 6/1983 | France . |

Primary Examiner—Howard N. Goldberg
Assistant Examiner—Steven Nichols
Attorney, Agent, or Firm—Arnold, White & Durkee

[57] ABSTRACT

The present invention concerns a new threaded joint for steel tubes, usable in particular in the petroleum industry, which contains a female element equipped with conical threads having an internal screw stop mating and a male element correspondingly threaded with a screw stop having a form corresponding to the female element. The male element stop and the female element stop are each manufactured by cold working using a tool capable of engaging in or on the threads of the corresponding element.

2 Claims, 8 Drawing Figures

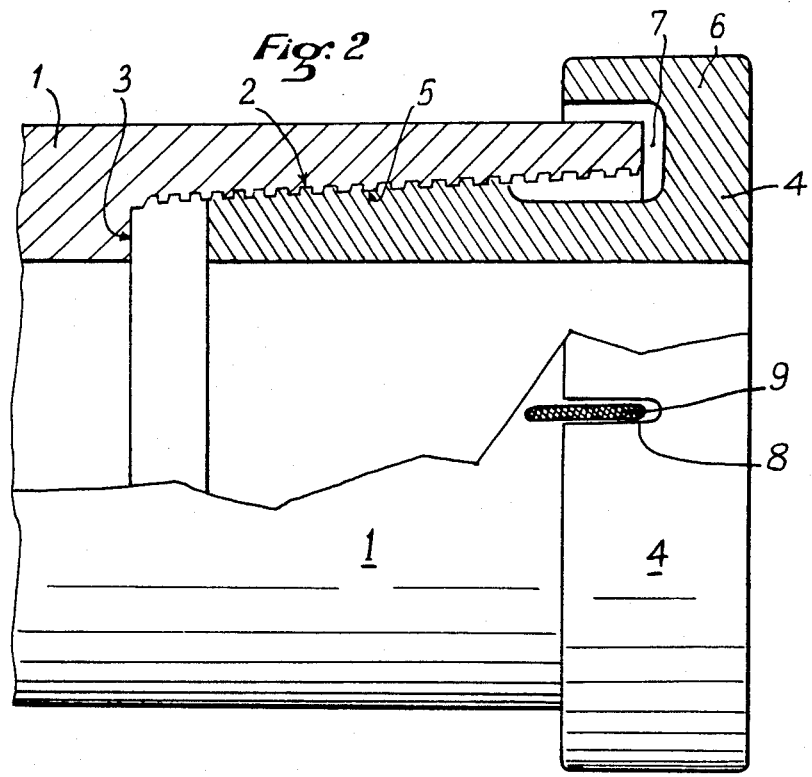
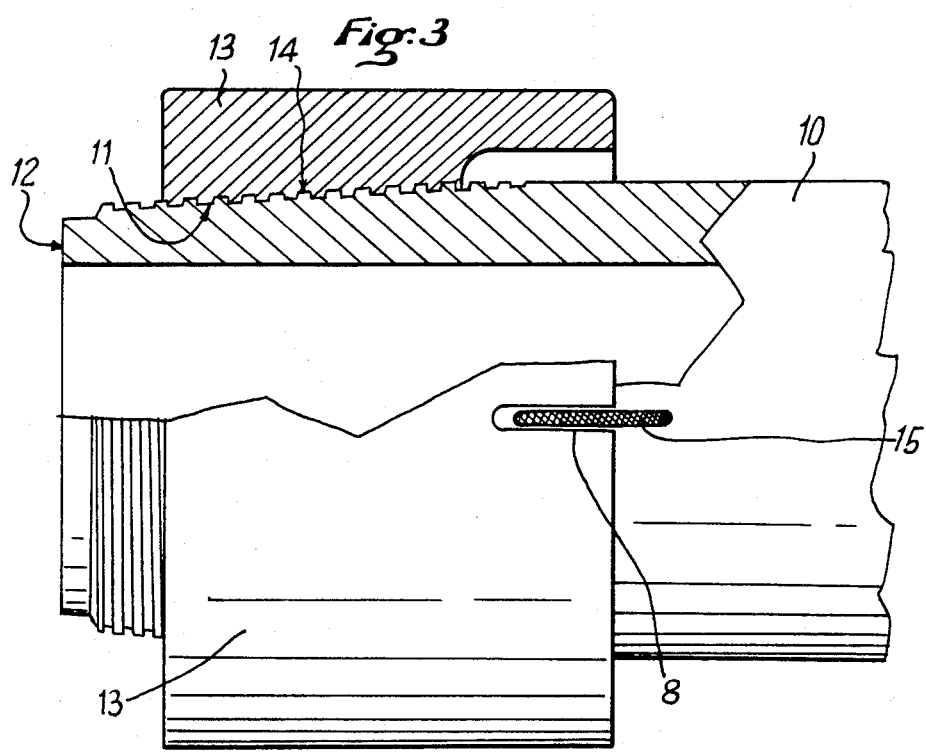

METHOD AND APPARATUS FOR MAKING A JOINT FOR STEEL TUBES

The present invention concerns a new threaded joint for steel tubes, usable in particular in petroleum production, a process for manufacturing this joint and tooling for execution of this process.

Threaded joints are already known for steel tubes intended for petroleum production, which contain a female element equipped with a truncated threading and a screw stop at the internal end of the threading, as well as a male element equipped with external truncated threading capable of meshing in the internal truncated threading of the female element, and an end stop intended to cooperate with the screw stop of the female element.

When such joints are not machined in the ends of tube sections that have been machined by forging or upsetting, it often happens, especially for tubes of small diameter and limited thickness, that the screw stops that are located at the end of the male element and the inside of the threading of the female element have sections that are too weak to support the stresses to which they are subjected.

This is why, for example, for a steel tube 60 mm in diameter and 5.5 mm thick, the width of the stop can only be 3 to 3.5 mm which limits to about 150 kgm the torque that can be exerted on this joint beyond contact of the stops without producing permanent deformation that compromises the interchangeability of elements.

Considering the various conditions for use of tubes equipped with such joints (traction or axial compression and an internal or external pressure), it is necessary to ensure a certain monolithism of the joint by applying a determined prestress at the level of the screw stops.

Moreover, for the same reasons, it is necessary to ensure radial interference between the male and female elements, an interference that is obtained by using conical threading.

This is why the screwing torque of a joint of this type is equal to the sum of the torque necessary to overcome radial interference (i.e., countersinking by screwing the male element into the female element until the end of the male element stops against the internal stop of the female element), and the torque at which the end of the male element is applied axially against the stop of the female element.

It is also known that, considering the manufacturing tolerances, the torque necessary to overcome radial interference and to bring the end of the male element against the stop of the female element can vary over a ratio of at least 1 to 4, depending on the type of joint. This means that the remaining torque that permits axial application of the end of the male element against the stop of the female element is capable of varying over a very wide range.

It even happens in some cases, especially for tubes of limited diameter that, considering the machining tolerances of threadings, one reaches a range of screwing torque that is very limited, and slight increase in tolerances can even make this torque range zero in some cases.

To better grasp this phenomenon one can see in FIG. 1 a threading curve of a joint of this type, the abscissas representing the excess diameter of the male element relative to the diameter of the female element at the moment when the end of the male element stops against the stop of the female element, the ordinates representing the torque applied to the joint.

Curves OAA' and OBB' correspond to joints of the same type, but whose threads are found at the limits of machining tolerance, curve OAA' corresponding to a joint for which the end of the male element is applied against the end of the female element after applying limited torque in overcoming the radial interference of the male element in the female element, whereas OBB' corresponds to a joint for which the end of the male element is only applied against the end of the female element after substantial torque to overcome the radial interference of the male element in the female element.

Curve OAB in FIG. 1 corresponds to the increase in torque necessary to overcome increasing interference before the end of the male element is applied against the end of the female element.

One sees that this curve increases relatively slowly. On the other hand, when the end of the male element is brought against the end of the female element, the torque increases very rapidly without a substantial increase in radial interference, owing to the fact that only limited rotation of the male element relative to the female element is then produced.

Points A' and B' correspond to torques for which plastic deformations that render the joints unusable or at least noninterchangeable occur on the end of the male element and on the end of the female element.

We note that the torque applied to the joint, from the moment when the end of the male element is in contact with the end of the female element and until the moment when severe deformations intervene on the stop surfaces, is essentially the same as the manufacturing tolerances that exist at the level of threading. This is revealed in FIG. 1 by the fact that the parts of curve AA' and BB' have essentially the same length.

It is from these curves OAA' and OABB' that one can determine the clamping torque that must be applied to the joint, this torque being found between the limits C1 and C2.

We note in FIG. 1 that the joint that produces curve OAA' corresponds for a given clamping torque to limited radial interference and a substantial pressure on the screw stops.

On the other hand, the joint that produces curve OABB' corresponds for a given clamping torque to substantial radial interference and a limited pressure on the screw stops.

One understands under these conditions that to determine a zone of clamping torques that will be large enough and ensure at the same time sufficient radial interference at the thread level and a sufficient axial pressure on the screw stops, it is of interest to bring points A and B of the curve in FIG. 1 close to each other, that is, to locate the stop of each of the elements of the joint relative to its thread as precisely as possible.

The object of the present invention is a new joint of the type just mentioned which presents the advantage of possessing on each of its elements a screw stop that, on the one hand, is located precisely relative to the thread and, on the other hand, whose mechanical resistance has been increased by cold working.

The object of the present invention is a threaded joint for steel tubes, intended especially for use in the petroleum industry, of a type containing a female element equipped with an internal truncated thread at the end of which there is a screw stop, and a male element equipped on the end with an external truncated thread corresponding to that of the female element and a screw stop whose shape corresponds to that of the female element, characterized by the fact that the stops of the male element and the female element each were machined by cold deformation and work-hardening by means of a tool equipped with threading capable of meshing in or on the threading of the corresponding element.

Another object of the present invention is a new process for manufacturing the joint as defined above, this process being characterized by the fact that one carries out a first machining of the male element and the female element of the joint and proceeds to final machining of the threads, keeping only the surfaces of the screw stop in the rough-machined condition; one uses a male thread gauge on the threading of the female element and a female thread gauge on the threading of the male element, these two gauges each being provided with a mark arranged so that when these two thread gauges are screwed by hand onto one another, the two marks in question are located on the same generatrix; that one notes on the female element of the joint the mark of the male gauge and notes on the male element the mark of the female gauge; that one engages a steel male threaded mandrel with high mechanical characteristics in the female element, this mandrel having on its end the shape that the screw stop of the female element must have, and said male mandrel being equipped on its periphery with a mark corresponding to the mark of the already cited female gauge when the latter is engaged and screwed by hand onto said mandrel; that by means of a machine capable of exerting an increased torque one rotates the male threaded mandrel relative to the female element of the joint so that the mark of the mandrel is brought to a preestablished distance beyond the mark of the female element, cold working the surface that represents the screw stop of the female element by means of the end of the male mandrel; that one unscrews the male mandrel from the female element; and that one carries out an operation of the same type on the male element by means of a female mandrel that is equipped with a mark corresponding to that of the already cited male gauge and that is screwed onto the end of the male element until the mark of the mandrel is brought to a preestablished distance beyond the mark of the male element.

Another object of the present invention is a machine intended to execute the process discussed above, this machine being characterized by the fact that it consists of a male gauge and a female gauge, equipped with threads capable of meshing with the threads of the female element and the male element of the joint, each of these gauges having a mark arranged so that when the two gauges are manually screwed onto one another, these two marks are found on the same generatrix, said machine also comprising a male mandrel and a female mandrel with threads and working surfaces corresponding to the threads and surfaces of the screw stop of the male element and the female element, each of these mandrels being equipped with a mark arranged so that when the male mandrel is screwed onto the already cited female gauge, and when the female mandrel is screwed onto the already cited male gauge, the marks of the gauges and the mandrels are found on the same generatrix.

To better explain the invention we shall now describe as an illustration, which is in no way limiting, a method of execution taken as an example and shown in the enclosed drawing.

In this drawing:

FIG. 1 is a curve representing the torque exerted on the joint as a function of interference of the threads of the male element and the female element, FIG. 2 is a partial cross section of a male gauge according to the invention, FIG. 3 is a partial cross section of a female gauge according to the invention.

Figure 4:
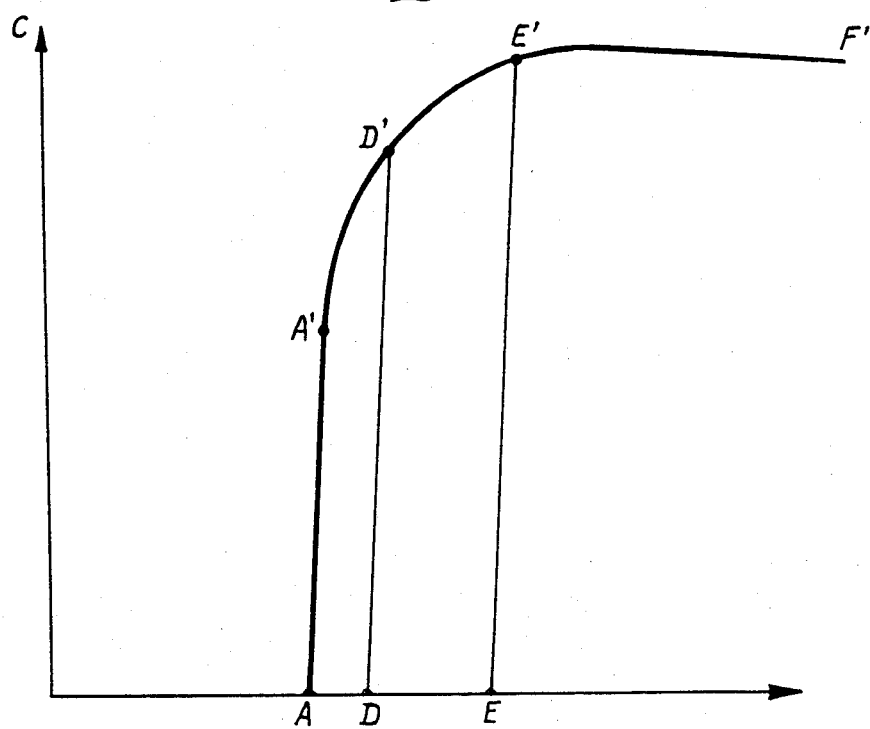
Figure 5:
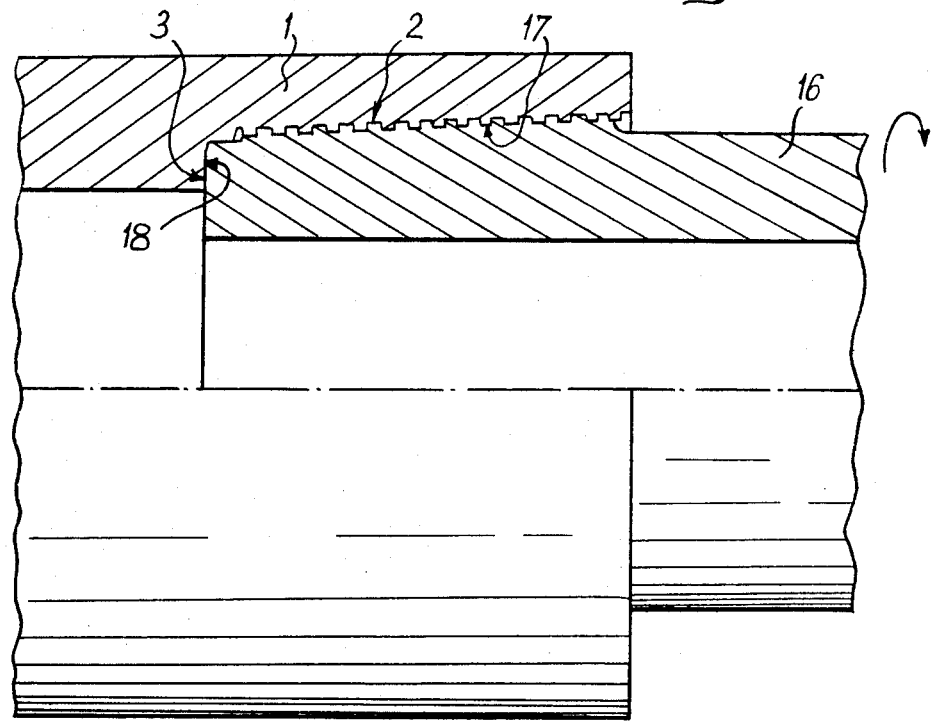
Figure 6:
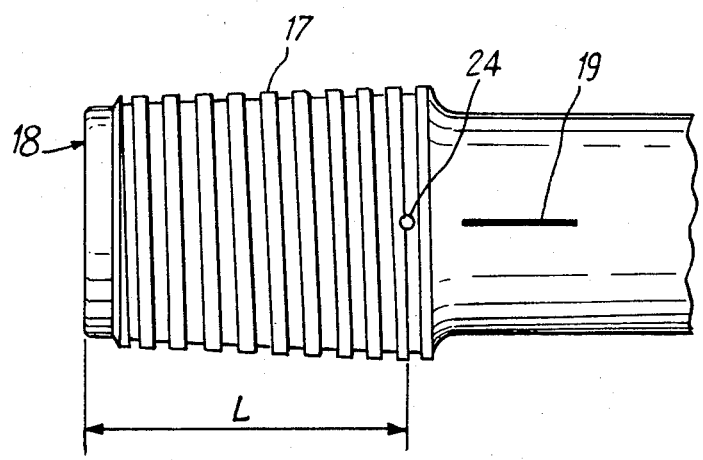
Figure 7:
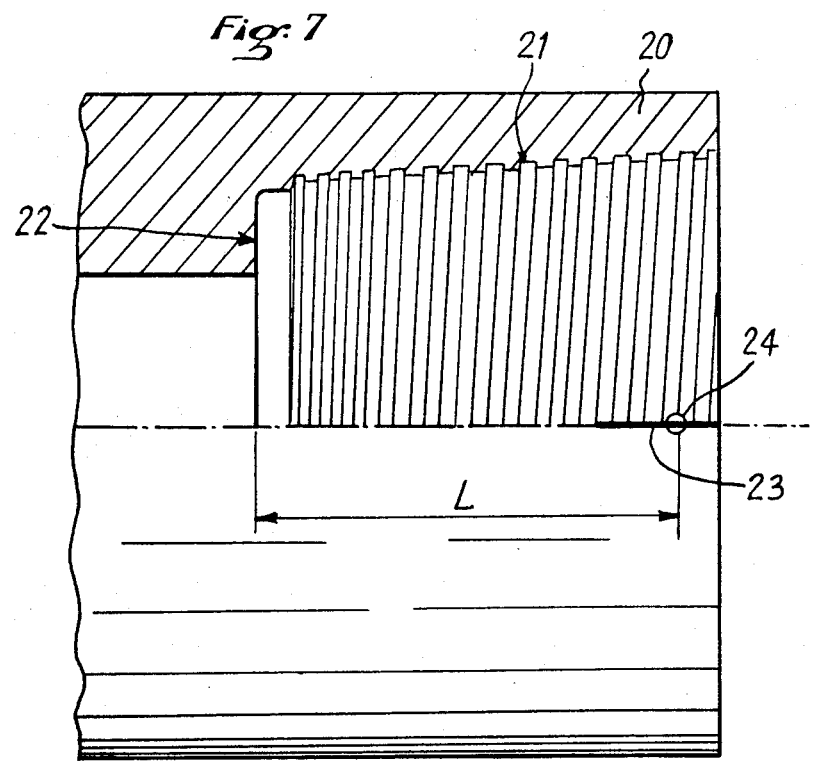
Figure 8:
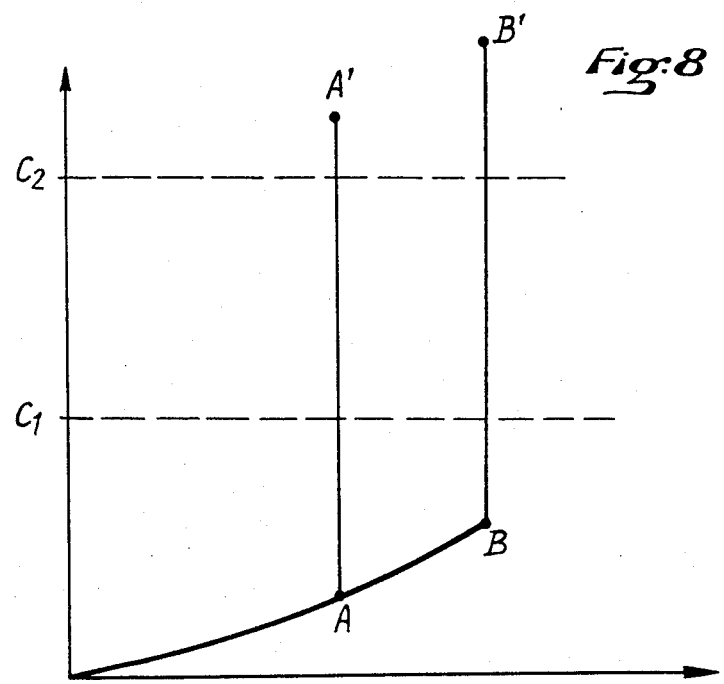

FIG. 4 is a curve showing the torque necessary to obtain a given rotation of the male element relative to the female element, FIG. 5 is a cross section during final machining with the male mandrel of the screw stop of the female element, FIG. 6 is a front view of the mandrel used in FIG. 5, FIG. 7 is a cross section of a mandrel that permits final machining of the screw stop of the male element of the joint, and FIG. 8 represents the threading torques as a function of interference of threads of the joints according to the invention.

The explanations concerning FIG. 1 were given during the description during the state of the art.

FIG. 2 schematically shows a cross section of the female element 1 which is equipped with internal threading 2 and a screw stop 3. In the method illustrated this screw stop 3 is a plane stop perpendicular to the axis of the tube, but it goes without saying that this stop could be of different shape, say, conical, concave or convex, or even present a more complex shape, such as consisting of two conical surfaces of opposite conicity.

According to the invention, threading 2 of the female element is machined fully, whereas the surface of the screw stop 3 is only subjected to premachining which leaves a machining allowance on this stop which exists, whatever the machining tolerances that can occur during manufacture of the female element.

One also sees in FIG. 2 a male gauge 4 that is equipped with male threading 5 corresponding to threading 2 of the female element, the gauge 4 meshing with the threading of the female element without coming in contact with any other part of this female element in order to permit free screwing by hand of gauge 4 into threading 2. Gauge 4 contains a collar 6 that is equipped with a recess 7 that can receive the end of the female element. The collar 7 contains elongated scalloping 8 which permits making of a mark according to the invention on the external generatrix of the female element 1.

This mark can be made by marking by means of a divider point or by a line of paint or similar line.

In FIG. 3 one sees the male element 10 of the joint which is equipped with external threading 11 whose shape corresponds to the internal threading 2 of the female element. The male element contains a screw stop 12 on its end.

According to the invention, final machining of threading 11 is carried out, leaving the surface of the screw stop 12 in the premachined state, that is, with a slight excess of metal, whatever the machining tolerance for the end of the male element.

One also sees a FIG. 3 a female gauge 13 that consists of a ring equipped with internal threading 14 corresponding to threading 11 of the male element.

According to the invention, gauge 13 can be screwed by hand onto threading 11 of the male element without being in contact with the male element other than by the threading. The female gauge 13 contains on its periphery an elongated scalloping 8 that forms a mark whose location is such that when the female gauge 13 is screwed onto male gauge 4, the two scallopings 8 are arranged as an extension of one another.

In other words, the two scallopings 8 of the male gauge and female gauge correspond to the same generatrix when the two gauges are screwed by hand onto one another, that is, without a notable torque.

FIG. 4 shows curve AA'A'E'F' which represents the torque that during threading is absorbed only by the joint stop as a function of the rotation angle between the male element and the female element. As explained in FIG. 1, we find that, when the extremity of the male element arrives against the screw stop of the female element, the torque increases very rapidly in linear fashion as a function of rotation which corresponds to part AA' of the curve, whereupon the plastic deformations at the level of the screw stops cause the curve to bend slightly beyond point E' which corresponds to destruction of the screw stops.

On the other hand, we note that, if one exerts a rotation of the male element relative to the female element up to point D', which corresponds to work-hardening due to permanent deformation of the surfaces of the stops, when one unscrews the two elements and then rescrews them, one obtains a torque curve along ADD-'E'F'.

In other words, we find that the permanent deformation of the screw stops enables us to increase the magnitude of the linear part of curve DD' during the final threading of the joint.

The process according to the present invention if based on the use of this phenomenon, which permits an increase in the magnitude of the linear part of the torque curve. We have shown in FIG. 5 a half cross section of a male mandrel 16 engaged on a female element 1.

FIG. 6 shows a front view of this mandrel 16 which contains threading 17 corresponding to threading 2 of the female element, and a front work surface 18 whose shape corresponds to the shape that the screw stop 3 of the female element must have.

This mandrel is of steel with high mechanical characteristics.

According to the invention, it contains a mark 19 whose location was determined with female gauge 13 screwed by hand onto the mandrel, mark 19 being opposite notch 8.

FIG. 7 shows a half cross section of a female mandrel 20 which is also equipped with internal threading 21 corresponding to male threading 11 of the male element and which presents a work surface 22 in the shape of a shoulder whose shape corresponds to that which the end of the male element must have.

The external part of the female mandrel 20 also contains a mark 23 that is in a location so that this mark 23 corresponds to the slit 8 of the male gauge 4 when the latter is screwed by hand into the female mandrel.

According to the invention, machining of the male and female mandrels is such that the distance L existing on the female mandrel between the face of one given thread 24 at the level of mark 23 and surface 22 is equal to the distance L that exists on the male mandrel between the same face 24 of the same thread at the level of mark 19 and the surface 18 which is located at the end of the male mandrel.

In other words, when the male mandrel is screwed onto the female mandrel by hand, that is, without notable torque, at the moment when marks 19 and 23 correspond, surface 18 of the male mandrel comes in contact with surface 22 of the female mandrel and a radial interference at the level of the threading is encountered.

Under these conditions it is understood that, when one screws by force the male mandrel into the female element whose surface of the screw stop 3 has a machining allowance, and when one exerts a sufficient torque on the mandrel to bring mark 19 to a preestablishd distance beyond mark 9 which was made on the female element, as explained before, one obtains by work-hardening at the same time an increase in the hardness and elasticity of the metal near the surface of the screw stop 3 and exact positioning of this surface relative to the threading.

One also sees that the same result is obtained on the male element whose end surface has simply been premachined, when the female mandrel 20 is screwed onto the end of this element and when by means of a sufficient torque one brings mark 23 of the mandrel to a preestablished distance beyond mark 15 of the male element.

The preestablished distance that corresponds to the pitch between the mark of the mandrel and that of the tubular element is a function of the magnitude of the forces induced by radial interference that one desires to have at the level of the threads on the clamped joint, reinforcement being greater, the greater this distance.

One sees that according to the invention, one gains the advantage, by a simple and effective means, of improving the mechanical characteristics of a joint and also positioning the surfaces of the screw stop relative to the threads in a precise manner, despite manufacturing tolerances.

FIG. 8 shows the torque curves corresponding to FIG. 1 in the case of joints manufactured according to the invention.

We note that the linear parts AA' and BB' are larger than in the case of FIG. 1 which corresponds to joints now known. This is due to the increase in stress that can be supported by the screw stops.

Moreover, since according to the invention the surfaces of the screw stop are positioned with much greater precision relative to the thread, points A and B are closer to one another so that the torques corresponding to points A and B are closer to one another.

This means that it is possible to choose a zone of torques C1, C2 that is much more substantial than with joints according to the state of the art, ensuring an axial stress on the screw stops that is more important and better safety with respect to excessive screwing.

We claim:
1. Process for manufacturing a pipe joint comprising one male element with an external conical threading and a torque limitative shoulder at its end and one female element with a corresponding internal conical threading and an inside correponding torque limitative shoulder consisting of:
   pre-machining the male and the female elements;
   final machining the threadings of the male and of the female elements;
   providing a male thread gauge corresponding to the threading of the female element and a female thread gauge corresponding to the threading of the male element, each of said gauges being provided with an index disposed on a generatrix, the position of said indexes being such that when the male and the female gauges are screwed together by hand, said indexes are located on the same generatrix;

engaging by hand said male thread gauge on the female element and noting a mark on the female element on the same generatrix as the index of said male thread gauge;

engaging by hand said female thread gauge on the male element and noting a mark on the male element on the same generatrix as the index of said female thread gauge;

providing a male threaded mandrel made of a steel with high mechanical characteristics having on its end the shape that the external torque limitative shoulder of the male element must have after its machining is completed, said male threaded mandrel being provided with an index located on the same generatrix as the index of said female gauge when said female gauge is screwed by hand onto said male threaded mandrel;

providing a female threaded mandrel made of a steel with high mechanical characteristics having the internal shape that the internal torque limitative shoulder of the female element must have after its machining is completed, said female threaded mandrel being provided with an index located on the same generatrix as the index of said male gauge when said male gauge is screwed by hand into said female threaded mandrel;

screwing said male threaded mandrel into the female element until the generatrix of the index of the male threaded mandrel is positioned at a predetermined distance beyond the generatrix of the index of the female element and disengaging the male threaded mandrel from the female element;

screwing said female threaded mandrel onto the male element until the generatrix of said index of the female threaded mandrel is positioned at a predetermined distance beyond the generatrix of the index of the male element and disengaging the female mandrel from the male element.

2. A set of tools for use in making the male and female elements of a pipe joint having conical threading wherein the male element has a torque limitative shoulder at its external end and the female element has an internal torque limitative shoulder, comprising:

a male thread gauge corresponding to the threading of the female element of said joint and a female thread gauge corresponding to the threading of the male element of said joint, each of said gauges being provided with an index disposed on a generatrix, the position of said indexes being such that when said male and female gauges are screwed together by hand, said indexes are located on the same generatrix;

a male threaded mandrel made of a steel with high mechanical characteristics having on its end the shape that said external torque limitative shoulder of said male element of said joint must have after complete machining, said male threaded mandrel being provided with an index located on the same generatrix as the index of said female gauge when said female gauge is screwed by hand onto said male threaded mandrel; and a female threaded mandrel made of a steel with high mechanical characteristics having the internal shape that the internal torque limitative shoulder of the female element of the joint must have after complete machining, said female threaded mandrel being provided with an index located on the same generatrix as the index of said male gauge when said male gauge is screwed by hand into said female threaded mandrel.

* * * * *